(12) United States Patent
Kost et al.

(10) Patent No.: US 6,641,234 B2
(45) Date of Patent: Nov. 4, 2003

(54) METHOD FOR IMPROVED ANTI-LOCK BRAKING CONTROL FOR ALL-WHEEL DRIVE VEHICLES HAVING A VISCOUS COUPLING OR A VISCOUS LOCK

(75) Inventors: Friedrich Kost, Kornwestheim (DE); Gerd Busch, Gerlingen (DE); Dieter Kunz, Ditzingen (DE); Matthias Reichhelm, Grossbottwar (DE); Ralf Gutmann, Jagsthausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/808,083

(22) Filed: Mar. 14, 2001

(65) Prior Publication Data
US 2002/0005663 A1 Jan. 17, 2002

(30) Foreign Application Priority Data
Mar. 20, 2000 (EP) .............................. 00105896

(51) Int. Cl.$^7$ ................................. B60T 8/62
(52) U.S. Cl. ....................... 303/190; 303/186
(58) Field of Search ................. 303/143, 186, 303/190

(56) References Cited

U.S. PATENT DOCUMENTS

| 4,747,643 A | * | 5/1988 | Lanzer ........................... 303/2 |
| 4,865,396 A | * | 9/1989 | Sato ............................. 303/110 |
| 5,333,943 A | * | 8/1994 | Kashiwabara et al. ...... 303/112 |
| 5,487,596 A | * | 1/1996 | Negrin ....................... 303/149 |
| 5,615,935 A | * | 4/1997 | Beyer et al. ................ 303/195 |
| 5,860,710 A | * | 1/1999 | Takemasa .................... 303/190 |
| 5,941,613 A | * | 8/1999 | Tagawa ....................... 303/190 |
| 5,957,550 A | * | 9/1999 | Watanabe .................... 303/175 |

FOREIGN PATENT DOCUMENTS

| EP | 0 503 025 | 9/1992 |
| JP | 4-306159 | * 10/1992 |

* cited by examiner

Primary Examiner—Jack Lavinder
Assistant Examiner—Bradley King
(74) Attorney, Agent, or Firm—Kenyon & Kenyon

(57) ABSTRACT

A method for controlling a braking system in an all-wheel drive vehicle having a viscous coupling or a viscous lock, wherein a viscous torque acting on a wheel is estimated, the viscous torque is taken into account in estimating a desired braking pressure for the wheel, and the desired braking pressure is applied to the wheel.

20 Claims, 3 Drawing Sheets

METHOD FOR IMPROVED ANTI-LOCK BRAKING CONTROL FOR ALL-WHEEL DRIVE VEHICLES HAVING A VISCOUS COUPLING OR A VISCOUS LOCK

The present invention relates to a method for improved antilock braking control for all-wheel drive vehicles having a viscous coupling or a viscous lock.

Electronic antilock braking systems ("ABS") have been known and used for several years. An example of an electronic antilock braking system as implemented in a vehicle dynamic control system is disclosed in European Patent Application EP 0 503 025 B1. That braking system operates based on calculated wheel torques or wheel braking pressures, but does not account for differences in wheel torques or braking pressures due to the viscous torque from a viscous coupling or a viscous lock in an all-wheel drive vehicle.

Some all-wheel drive vehicles use a viscous coupling (an encapsulated multi-plate unit with a high-viscosity silicone fluid) as a means of activating the all-wheel drive. Once the traction limit at the permanently-engaged axle is exceeded, the viscous coupling responds to variations in slip by transferring torque to the secondary drive axle according a viscous-drive response curve. In a vehicle with a viscous lock, because of the presence of a center differential, the driving torque is permanently distributed to the front and rear axles (with the ratio depending on the design, for example ⅓ to the front axle and ⅔ to the rear axle). The viscous lock, like the viscous coupling, can transfer supplemental torque between the front and rear axle when there is a speed difference between the front and rear axle.

Because known ABS control systems do not adequately account for the variations in torque at each wheel due to the transfer of torque by the viscous coupling or viscous lock, these systems often apply the wrong braking pressure to the wheels resulting in less than optimal braking performance.

The present invention relates to a method for improved antilock braking control for all-wheel drive vehicles having a viscous coupling or a viscous lock by taking into account the torque due to the viscous coupling or viscous lock which is acting on a wheel. The present invention also relates to the improvement of the formation of reference values for the torque acting upon a wheel of an all-wheel drive vehicle having a viscous coupling or viscous lock.

By more accurately taking into account of the torque applied by the viscous coupling or viscous lock on each wheel, an ABS control unit can more accurately respond by increasing or decreasing the braking pressure on the wheels as necessary, resulting in improved braking performance.

Specifically, the present invention relates to a method for controlling a braking system in an all-wheel drive vehicle having a viscous coupling or a viscous lock, wherein a viscous torque acting on a wheel is estimated, the viscous torque is taken into account in estimating a desired braking pressure for the wheel, and the desired braking pressure is applied to the wheel.

If the viscous torque acting on the wheel is not known to a precise degree, it may be advantageous to take the viscous torque into account in calculating the desired braking pressure only if the viscous torque is less than or equal to zero. The viscous torque is calculated as a function of a difference between a front axle cardan shaft speed and a rear axle cardan shaft speed, and can also be taken into account in estimating a braking force at the wheel. A reduction factor can be introduced to adjust the effect of the viscous torque for high differences in front and rear axle cardan drive shaft speeds. For example, the reduction factor can be equal to approximately one for small differences in front and rear axle cardan shaft speeds and can be equal to approximately zero for large differences. Small differences in speed is an indication that the viscous coupling or viscous lock is functioning normally and large differences in speed is an indication that the viscous coupling or viscous lock is functioning poorly.

Figure 1B:
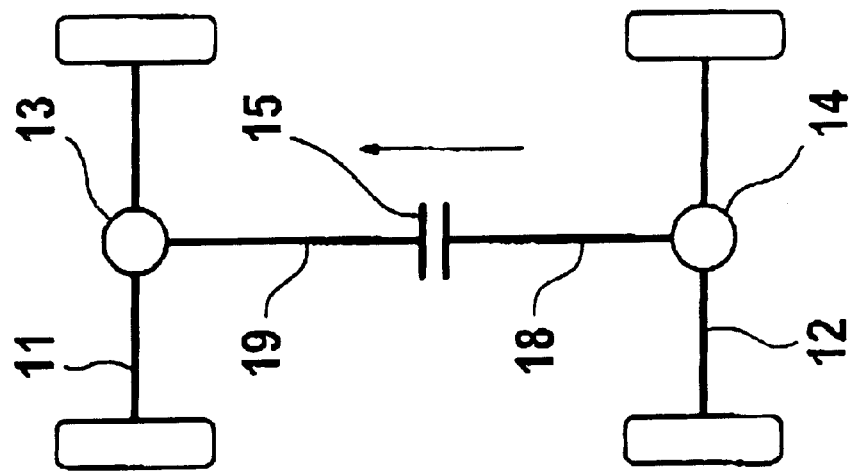
FIGS. 1a and 1b are diagrams illustrating two of the many different drive concepts for all-wheel drive vehicles.
Figure 1A:
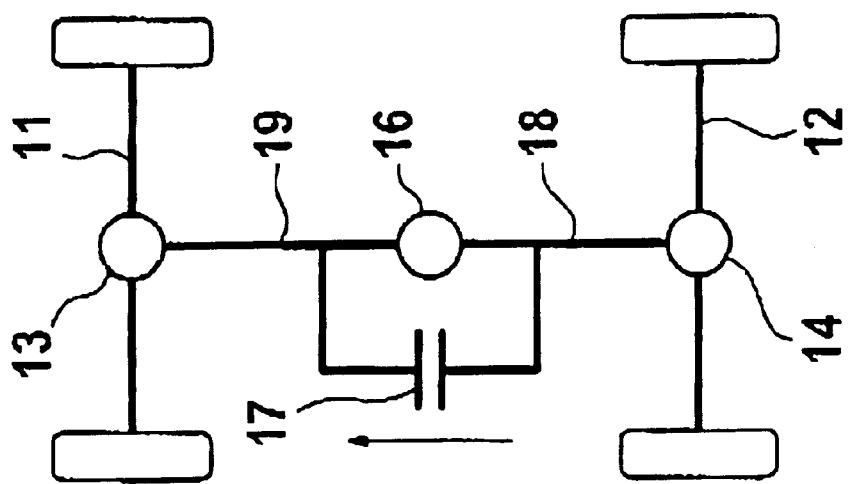

Each of the vehicles in FIGS. 1a and 1b are shown having a front axle 11, rear axle 12, front axle cardan shaft 19, rear axle cardan shaft 18, front universal joint 13 and rear differential joint 14. FIG. 1a illustrates an all-wheel drive vehicle having a center differential 16 and a viscous lock 17. FIG. 1b illustrates an all-wheel drive vehicle having a viscous coupling 15 and no center differential.

Figure 2:
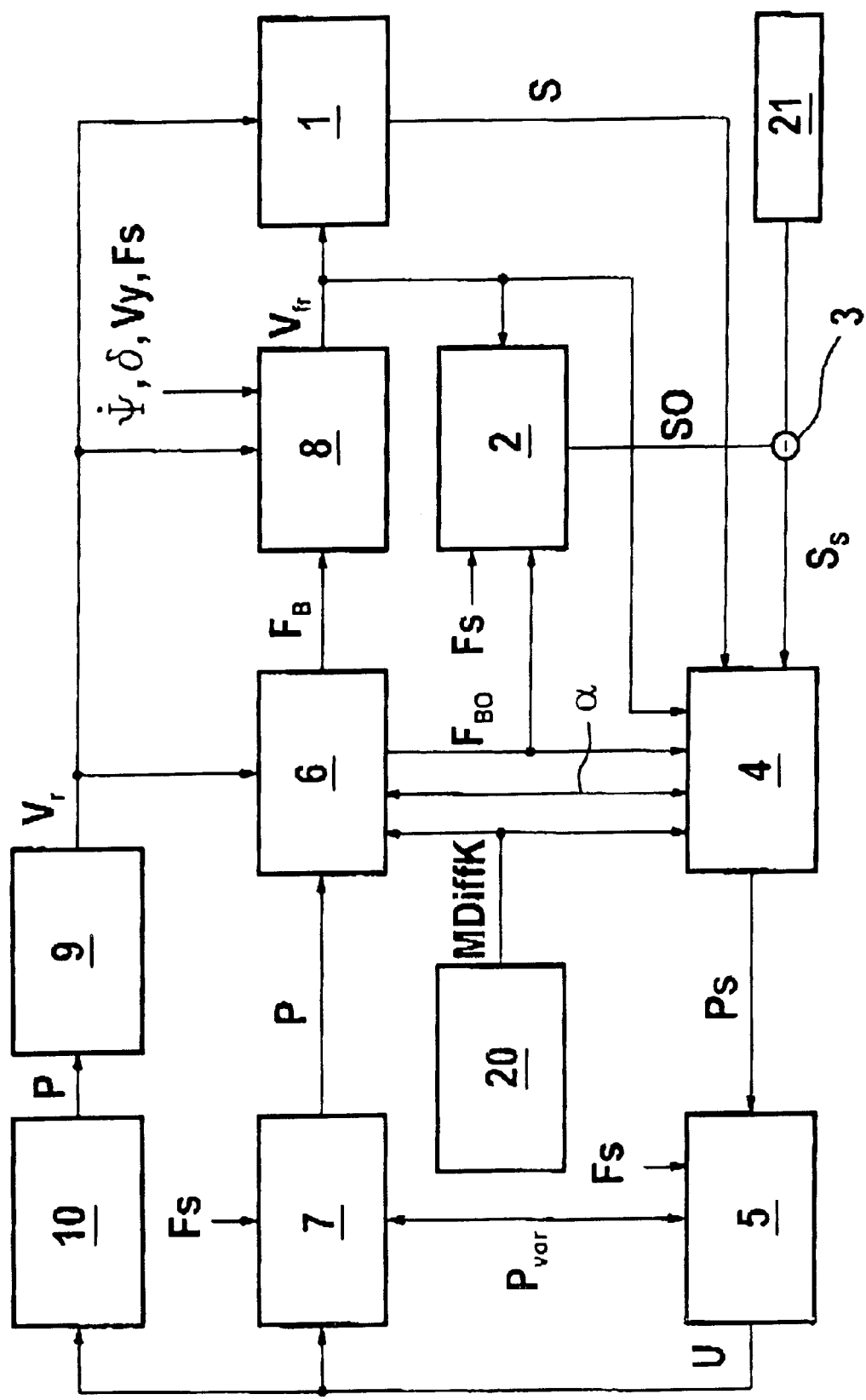
FIG. 2 is a block diagram illustrating the overall concept of the improved ABS control system according to the present invention.

The functions illustrated in FIG. 2 are similar to those described in European patent application EP 0 503 025 B1, and differ only in that the torque acting on the wheel that is transferred by the viscous coupling or viscous lock between the two vehicle axles (referred to below as "viscous torque," or MDiffK) is calculated at block 12, and that value MDiffK is taken into account in both the calculation of the braking force Fb at block 6 and the in setting the desired (or setpoint) pressure Ps by the slip regulator at block 4. The calculation of the viscous torque acting on the wheel is described in more detail below.

At wheel 9, the wheel's peripheral velocity $V_r$ is measured and fed to a slip calculator 1. The slip calculator is also fed with the velocity of the freely rolling wheel $V_{fr}$, which could be measured in any manner, or calculated as shown in FIG. 2, in a $V_{fr}$-observer 8 and fed to the slip calculator. $V_{fr}$ can be measured from the longitudinal vehicle velocity. Observer 8 calculates the quantity $V_{fr}$ on the basis of the quantities yaw rate $\psi^*$, steering angle $\delta$, transverse velocity Vy, and lateral guiding forces Fs, braking forces Fb, and the peripheral velocities of all wheels. In this context, $\psi^*$ and $\delta$ are measured quantities, whereas Vy and Fs are estimated quantities. In slip calculator 1, slip value $S=(1-V_r/V_{fr})$ is calculated from $V_{fr}$ and $V_r$, and fed to a slip regulator 4, which is additionally fed with a set point slippage SO ascertained in a block 2, as well as with quantities $V_{fr}$, slip angle $\alpha$, the viscous torque MDiffK calculated at block 12, and mean braking force $Fb_0$.

Calculated in a further block 5, with the aid of an inverse hydraulic model, and using quantities prepressure $P_{vor}$ and lateral guiding force Fs, is trigger time U required to activate a solenoid valve existing in hydraulic block 10 for adjusting a brake pressure P at wheel 9, which corresponds to set point pressure Ps. P can be measured, however, it can also be calculated using a hydraulic model 7, prepressure $P_{vor}$ and lateral guiding force Fs. A braking force estimator 6 ascertains braking force $F_B$ resulting from P, $V_{fr}$, $\alpha$, and the viscous torque MDiffK, which is required by $V_{fr}$-observer 8 for the calculation. In an adder 3, a set point slip deviation $\Delta_{Ss}$ coming from a vehicle dynamics controller 11 can be superimposed upon set point slippage SO of block 2, resulting in a set point slippage $S_s$.

Whether the vehicle has a viscous coupling without a center differential, or a center differential and a viscous lock, in both cases the magnitude and sign of the transmitted viscous torque MVisco is a function of the magnitude and sign of the cardan drive shaft speed difference DnKar and is calculated as follows:

$$MVisco = cVisco(nKarR) * DnKar$$

where DnKar is equal to the speed of the rear axle cardan shaft nKarR minus the speed of the front axle cardan shaft nKarF, and where cVisco (nKarR) is the characteristic curve of the viscous coupling 15, or viscous lock 17.

The viscous torque at the wheel MDiffK is calculated by the following equations:

$$MDiffK = MVisco * ueDiff/2 \text{ for a front wheel,}$$

and $$MDiffK = MVisco * ueDiff/2 \text{ for a rear wheel}$$

where ueDiff is the differential transmission ration.

If significant viscous torques only occur briefly, i.e. during brief drive shaft speed differences between the front axle drive shaft and the rear axle drive shaft, then it is sufficient to merely consider this torque in the calculation of the desired braking pressure for the wheel Ps. This can be done with the following equation:

$$Ps = (Ms + MDiffK)/Cp \qquad (1)$$

where Cp is the braking constant calculated by dividing the brake torque MBrake by the braking pressure at the wheel $P_w$, and Ms is the wheel torque that is desired by the ABS electronic control unit.

If MDiffK is known quite precisely, the equation (1) can be used to compensate for the so-called disturbance torque that the viscous coupling or viscous lock exerts on the wheel.

However, when properties of the viscous coupling or viscous lock are not known precisely, due for example to temperature effects, aging, etc., of the viscous fluid, the calculation of MDiffK can be very inaccurate. Especially if the estimate of MDiffK is positive and larger than the actual viscous torque value (i.e. too great a driving torque is estimated), equation (1) may have a destabilizing effect on slip control. A value of MDiffK that is too large results in a value of Ps that is too large. This causes the wheel speed to be reduced, and consequently the computed MDiffK is further increased, and Ps is then, in turn, increased more. This positive feedback effect can be avoided if equation (1) is only evaluated for MDiffK<=0, whereby the following equation is used instead for MDiffK>0:

$$Ps = Ms/Cp \qquad (1b)$$

If significant viscous torques occur continuously, e.g. because the rolling circumferences differ for the front and rear wheels or the front and rear wheels are being controlled to different brake slip values, then MDiffK must also be considered in the calculation of braking force. Otherwise the operating point of the controller would be calculated incorrectly, and steady state errors would occur in ABS control. The braking force is calculated as follows:

$$Fb = (1/r)*[(J/r)*(dvWheel/dt) + Cp*P_w - MDiffK] \qquad (2)$$

where Cp is the braking constant, J is the moment of inertia of the wheel, r is the wheel radius, dvWheel/dt is the change in wheel peripheral velocity with respect to time, $P_w$ is the wheel braking pressure (which can be estimated or measured).

The characteristic curve of a viscous coupling or viscous lock is subject to large variations. Influencing factors may include:

Temperature dependency of viscosity of the fluid used

Aging of the fluid

Fluid loss due to leakage

Production related tolerances

These influencing factors are very difficult if not impossible to determine; consequently an assumed nominal viscous characteristic curve often deviates substantially from the real situation. Two cases and their effects should be differentiated:

1) Calculated value of cVisco is too small. In this situation, the function in ABS braking is improved, by taking into account the viscous torque, but the improvement is not to the extent that it could be, as the compensation is incomplete.

2) Calculated value of cVisco is too large: in this situation, the compensation due to equations (1) and (2) lead to a case of overcompensation. This can lead to control behavior which is worse than without compensation (underbraked or overbraked wheels).

Figure 3:
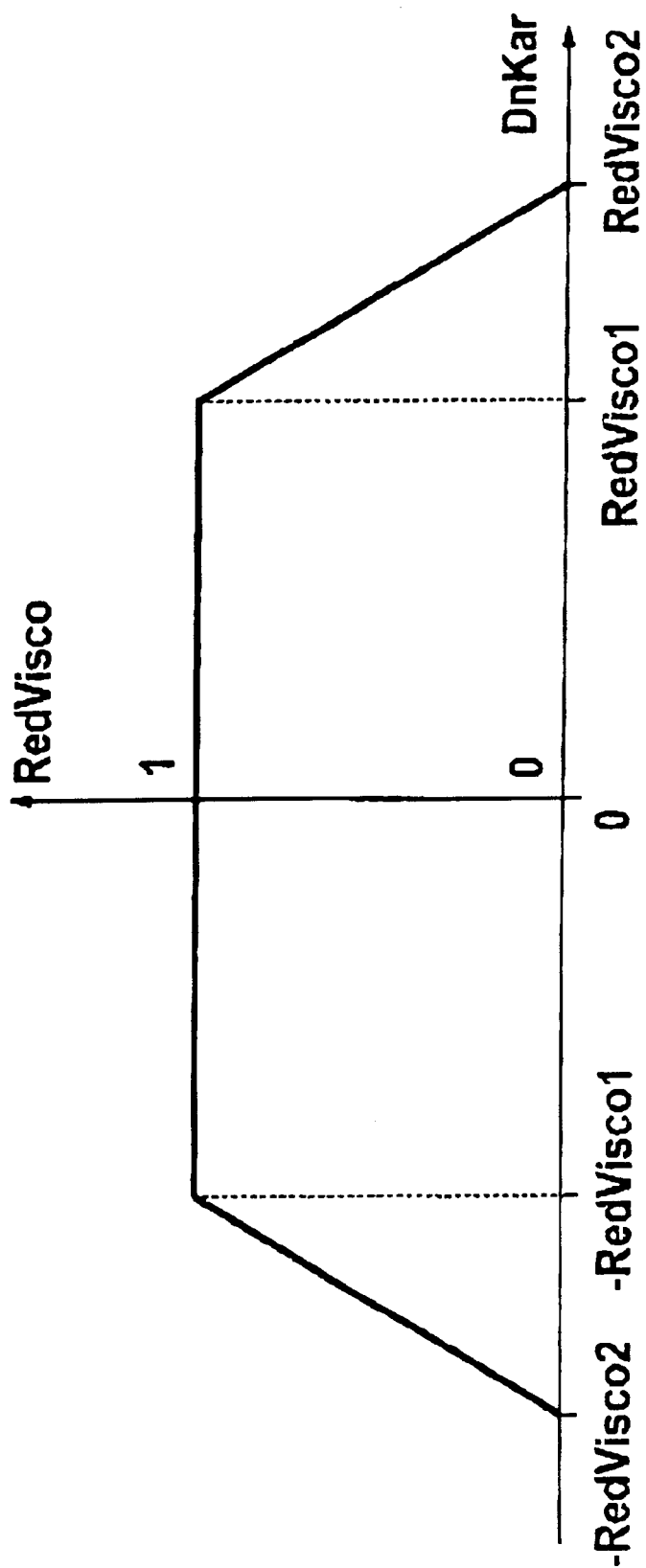
FIG. 3 is an example of a curve showing the relationship between a reduction factor, RedVisco, and a difference between a rear axle cardan shaft speed and a front axle cardan shaft speed.

The overcompensation depicted in case 2) can be reduced by appropriate actions. Namely, if a viscous coupling or viscous lock has a very small effect, then the speed differences during ABS will often be very large (lack of synchronization of the wheels). This leads to a situation where the error in cVisco has an especially strong effect on MVisco. To reduce this effect a reduction factor RedVisco can be introduced, which is a function of the drive shaft speed difference DnKar. FIG. 3 illustrates an example of a relationship between the reduction factor RedVisco and the drive shaft speed difference DnKar.

The viscous torque is then calculated as follows:

$$MVisco = cVisco(nKarR)*DnKar*RedVisco(DnKar) \qquad (3b)$$

The value RedVisco1 should be selected so that it is approximately as large as the DnKar values which occur in ABS controllers with nominal viscous coupling or viscous lock. RedVisco2 corresponds to DnKar values which are only reached with a viscous coupling or a viscous lock that is working poorly.

What is claimed is:

1. A method or controlling a braking system in an all-wheel drive vehicle having a viscous coupling or a viscous lock, characterized in that a viscous torque acting on a wheel is estimated, the viscous torque is taken into account in estimating a desired braking pressure for the wheel, and the desired braking pressure is applied to the wheel further characterized in that a reduction factor is used in estimating the viscous torque;

wherein the reduction factor is calculated as a function of a difference between a front axle cardan drive shaft speed and a rear axle cardan drive shaft speed.

2. The method as recited in claim 1, characterized in that the viscous torque is taken into a count in calculating the desired braking pressure only if the viscous torque is less than equal to zero.

3. The method as recited in claim 1, characterized in that the viscous torque is calculate as a function of the difference between the front axle cardan shaft speed and the rear axle cardan shaft speed.

4. The method as recited in claim 1, characterized in that the viscous torque is taken into account in estimating a braking force, and the estimated braking force is taken into account in estimating the desired braking pressure.

5. The method as recited in claim 1, characterized in that the reduction factor is equal to approximately 1 when the viscous coupling or viscous lock are functioning normally.

6. A method for controlling a braking system in an all-wheel drive vehicle having a viscous coupling or a viscous lock, characterized in that a viscous torque acting on a wheel is estimated, the viscous torque is taken into account in estimating a desired raking pressure for the wheel, and the desired braking pressure is applied to the wheel;

further characterized in that a reduction factor is used in estimating the viscous torque;

wherein the reduction factor is approximately equal to zero when the viscous coupling or viscous lock is functioning poorly.

7. The method as recited in claim 6, characterized in that the viscous torque is taken into account in calculating the desired braking pressure only if the viscous torque is less than or equal to zero.

8. The method as recited in claim 6, characterized in that the viscous torque is calculated as a function of a difference between a front axle cardan shaft speed and a rear axle card a shaft speed.

9. The method as recited in claim 6, characterized in that the viscous torque is taken into account in estimating a braking force, and the estimated braking force is taken into account in estimating the desired braking pressure.

10. The method as recited in claim 6, characterized in that the reduction factor is equal to approximately 1 when the viscous coupling or viscous lock are functioning normally.

11. A method for controlling a braking system in an all-wheel drive vehicle including one of viscous coupling and a viscous lock, comprising the steps of:

calculating a reduction actor as a function of a difference between a front axle cardan drive shaft speed and a rear axle cardan drive shaft speed;

estimating a viscous torque acting on a wheel in accordance with the reduction factor;

estimating a desired braking pressure for the wheel in accordance with the viscous torque; and applying the desired braking pressure to the wheel.

12. The method according to claim 11, wherein the desired braking pressure estimating step includes the substep of calculating the desired braking pressure in accordance with the viscous torque only if the viscous torque is less than or equal to zero.

13. The method according to claim 11, wherein the viscous torque estimating step include the substep of calculating the viscous torque as a function of the difference between the front axle cardan shaft speed and the rear axle cardan shaft speed.

14. The method according to claim 11, further comprising the step of estimating a braking force in accordance with the viscous torque, wherein the desired braking pressure is estimated in the desired braking pressure estimating step in accordance with the braking force estimated in the braking force estimating step.

15. The method according to claim 11, wherein the reduction factor is equal to approximately 1 when the one of the viscous coupling and the viscous lock is functioning properly.

16. A method for controlling a braking system in an all-wheel drive vehicle including one of a viscous coupling and a viscous lock, comprising the steps of:

estimating a viscous torque acting on a wheel in accordance with a reduction factor, the reduction factor a proximately equal to zero when the one of the viscous coupling and the viscous bc is functioning poorly;

estimating a desired braking pressure for the wheel in accordance with the viscous torque;

applying the desired braking pressure to the wheel.

17. The method according to claim 16, wherein the desired braking pressure estimating step includes the substep of calculating the desired braking pressure in accordance with the viscous torque only if the viscous torque is less than or equal to zero.

18. The method according to claim 16, wherein the viscous torque estimating step includes the substep of calculating the viscous torque as a function of a difference between a front axle cardan shaft speed and a rear axle cardan shaft speed.

19. The method according to claim 16, further comprising the step of estimating a braking force in accordance with the viscous torque, wherein the desired braking pressure is estimated in the desired braking pressure estimating step in accordance with the raking force estimated in the braking force estimating step.

20. The method according to claim 16, wherein the reduction factor is equal to approximately 1 when the one of the viscous coupling and the viscous lock is functioning properly.

* * * * *

UNITED STATES PATENT AND TRADEMARK OFFICE
CERTIFICATE OF CORRECTION

PATENT NO. : 6,641,234 B2
DATED : November 4, 2003
INVENTOR(S) : Friedrich Kost et al.

It is certified that error appears in the above-identified patent and that said Letters Patent is hereby corrected as shown below:

Column 2,
Line 25, change "European patent application" to -- European Patent Application --
Line 31, change "and the in setting" to -- and the calculation in setting --
Line 57, change "measured, however, it can" to -- measured, however; it can --

Column 3,
Line 19, change "the differential transmission ration." to -- the differential transmission ratio. --
Line 62, change "...+Cp*P$_w$-MDiffK]" to --...+Cp*p$_w$-MDiffK] --
Line 65, change "P$_w$ is the" to -- p$_w$ is the --

Column 4,
Line 19, change "(1) and (2) lead to" to -- (1) and (2) leads to --
Line 45, change "a method or controlling" to -- a method for controlling --
Line 57, change "taken into a count" to -- taken into account --
Line 61, change "torque is calculate" to -- torque is calculated --

Column 5,
Lines 22-23, change "rear axle card a shaft speed." to -- rear axle cardan shaft speed --

Column 6,
Line 2, change "step include the substep" to -- step includes the substep --

Signed and Sealed this

Second Day of August, 2005

JON W. DUDAS
*Director of the United States Patent and Trademark Office*